US009560668B1

(12) United States Patent
Sevindik

(10) Patent No.: US 9,560,668 B1
(45) Date of Patent: Jan. 31, 2017

(54) SYSTEMS AND METHODS FOR SCHEDULING LOW-DELAY TRANSMISSIONS IN A COMMUNICATION NETWORK

(71) Applicant: Sprint Spectrum LP, Overland Park, KS (US)

(72) Inventor: Volkan Sevindik, Reston, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 100 days.

(21) Appl. No.: 14/533,544

(22) Filed: Nov. 5, 2014

(51) Int. Cl.
  *H04W 72/04* (2009.01)
  *H04W 72/12* (2009.01)
  *H04L 5/00* (2006.01)
  *H04W 28/02* (2009.01)
  *H04W 28/08* (2009.01)

(52) U.S. Cl.
  CPC ........ *H04W 72/1231* (2013.01); *H04L 5/0057* (2013.01); *H04L 5/0075* (2013.01); *H04W 28/0236* (2013.01); *H04W 28/08* (2013.01); *H04W 72/042* (2013.01)

(58) Field of Classification Search
  CPC ........ H04L 47/32; H04L 47/125; H04L 47/22; H04L 47/24

USPC ......... 370/230, 235, 236, 329, 412
See application file for complete search history.

(56) References Cited

U.S. PATENT DOCUMENTS

| 7,466,983 B2* | 12/2008 | Hoff | H04L 29/06 370/230 |
|---|---|---|---|
| 2012/0314665 A1* | 12/2012 | Ishida | H01Q 21/28 370/329 |
| 2013/0128760 A1 | 5/2013 | Fujishima et al. | |
| 2014/0050103 A1 | 2/2014 | Niu et al. | |
| 2014/0161447 A1 | 6/2014 | Graves et al. | |
| 2015/0043335 A1* | 2/2015 | Testicioglu | H04L 45/48 370/230 |

* cited by examiner

*Primary Examiner* — Jamal Javaid

(57) ABSTRACT

Systems and methods are described for scheduling low-delay transmissions from an access node. Packet transmission delay data associated with communication links is received at a base band unit (BBU). The communication links can be routed between pluralities of antennas of the BBU. A link identification can be assigned to each of the communication links and to each antenna in communication with the BBU. A scheduling algorithm in communication with one of the antennas is selected, at the BBU, from a plurality of scheduling algorithms based on the packet transmission delay data associated with at least one of the communication links. Packet data for at least one wireless device may be transmitted using the selected scheduling algorithm.

15 Claims, 4 Drawing Sheets

SYSTEMS AND METHODS FOR SCHEDULING LOW-DELAY TRANSMISSIONS IN A COMMUNICATION NETWORK

TECHNICAL BACKGROUND

Telecommunication systems, such as cellular networks or other wireless networks, use network links to communicate with access nodes in the communication network and to coordinate packet transmissions of data to connected wireless devices. Accordingly, the system may rely on a well-established communication network to provide efficient communication between access nodes and connected wireless devices.

In certain circumstances, a portion of the network shared among wireless devices may experience high load (e.g., loading above a threshold) that stems from large amounts of data traffic or poor channel conditions. High-delay communication links may be disproportionately affected by increased data traffic and poor channel conditions. This makes high-delay communication links less effective than low-delay communication links and reduces overall spectral and network efficiency. Accordingly, a channel-aware system that effectively balances load, exploits channel quality variations, and provides a high quality service to users of the telecommunication system communicating through high-delay communication links is desirable.

Overview

Systems and methods are described for scheduling low-delay transmissions from an access node. Packet transmission delay data associated with communication links can be received at a base band unit (BBU). The communication links can be routed between pluralities of antennas of the BBU. A link identification can be assigned to each of the communication links and to each antenna in communication with the BBU. The identification numbers can be stored in the BBU and associated to one or more wireless device subscriber identities. A scheduling algorithm in communication with one of the antennas is selected, at the BBU, from a plurality of scheduling algorithms based on the packet transmission delay data associated with at least one of the communication links. Packet data for at least one wireless device may be transmitted using the selected scheduling module.

DETAILED DESCRIPTION

Figure 1:
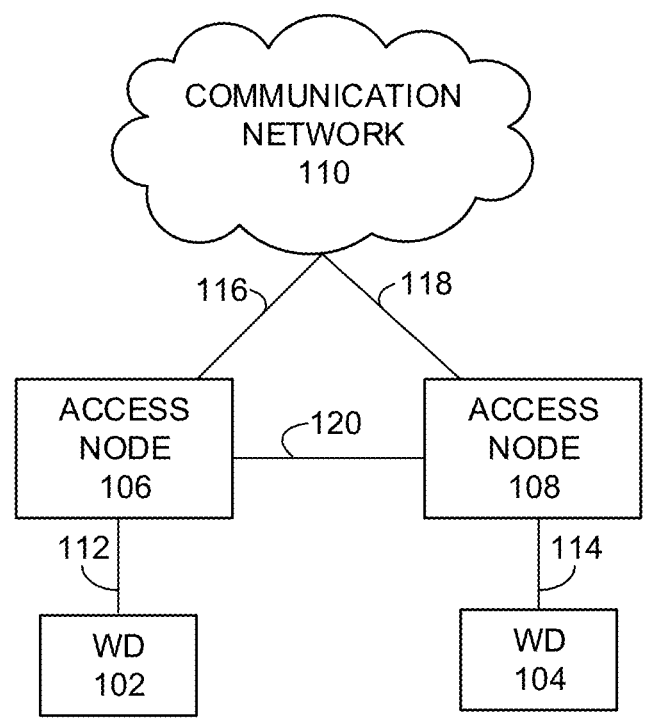
FIG. 1 illustrates an exemplary communication system for scheduling low-delay transmissions from an access node to a selected wireless device.

FIG. 1 illustrates an exemplary communication system 100 for scheduling low-delay transmissions from an access node to a selected wireless device. Communication system 100 can comprise wireless devices 102, 104, access nodes 106, 108, and communication network 110. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access nodes 106, 108 and communication network 110 which are omitted for clarity, including additional processing nodes, routers, gateways, and physical and/or wireless data links for carrying data among the various network elements.

Wireless devices 102, 104 can be any device configured to communicate over communication system 100 using a wireless communication link. For example, wireless devices 102, 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with respective access nodes 106, 108, any number of wireless devices can be implemented according to various exemplary embodiments disclosed herein.

Wireless devices 102, 104 can transmit and/or receive information over system 100 using various communication services. These services can include various voice data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access nodes 106, 108 can be any network node configured to provide communication between wireless devices 102, 104 and communication network 110. Access nodes 106, 108 can be short range access nodes or standard access nodes. A short range access node could include a microcell base station, a picocell base station, a femtocell base station, or the like and a standard access node could include a base transceiver station, a radio base station, an eNodeB device, or an enhanced eNodeB device, or the like. It is noted that while two access node 106, 108 are illustrated in FIG. 1, wireless devices 102, 104 can be in communication with any number of access nodes and/or relay nodes either directly or indirectly. Any number of access nodes and/or relay nodes can be implemented within system 100 and can be associated with different networks and can support different communication protocols and radio access technologies.

Communication network 110 can be a wired and/or wireless communication network, and can comprise processing nodes, routers, gateways, and physical and/or wireless data links for carrying data among various network elements, including combinations thereof, and can include a local area network, a wide area network, and internetwork (including the Internet). Communication network 110 can be capable of carrying data, for example, to support voice, push-to-talk, broadcast video, and data communications by a wireless device such as wireless device 102, 104. Wireless network protocols can comprise code division multiple access (CDMA) 1xRTT, Global System for Mobile communications (GSM), Universal mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 110 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 110 can also comprise additional base stations, controller nodes, telephony switches, internet routers, network gateways, computer systems, communication links, or some other type of communication equipment, and combinations thereof.

Communication links 112, 114, 116, 118, 120 can be wired or wireless communication links. Communication links 112, 114, 116, 118, 120 can use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, GSM, CDMA, WiMAX, LTE, or combinations thereof. Other wireless protocols can also be used. Links 112, 114, 116, 118, 120 can be a direct link or might include various equipment, intermediate components, systems, and networks.

In operation, access nodes 106, 108 may communicate with a plurality of wireless devices 102, 104 via remote radio heads (RRH) (not shown). The communication system 100 may provide wireless communication services to multiple carriers and subcarriers on different frequency bands (e.g., 1.25 GHz carrier, 1900 MHz carrier, 800 MHz carrier, etc.) and channels (e.g., 5 MHz channels, 10 MHz channels, 15 MHz channels, etc.).

In an exemplary embodiment, access nodes 106, 108 may include a low-delay scheduler configured to coordinate packet transmission of wireless resources (e.g., the next available physical resource blocks, wireless spectrum, etc.) from access nodes 106, 108 among connected wireless devices 102, 104 via RRHs (not shown). For example, the low-delay scheduler can collect and store capacity and transmission delay characteristics (e.g., guaranteed bit rate/non-guaranteed bit rate, busy hour, backhaul limitations/capacity, mobility, available spectrum, etc.) reported by wireless devices 102, 104 at a base band unit (BBU) of access nodes 106, 108 and distribute the wireless resources among connected wireless devices 102, 104 via RRHs based on the collected characteristics.

Figure 2:
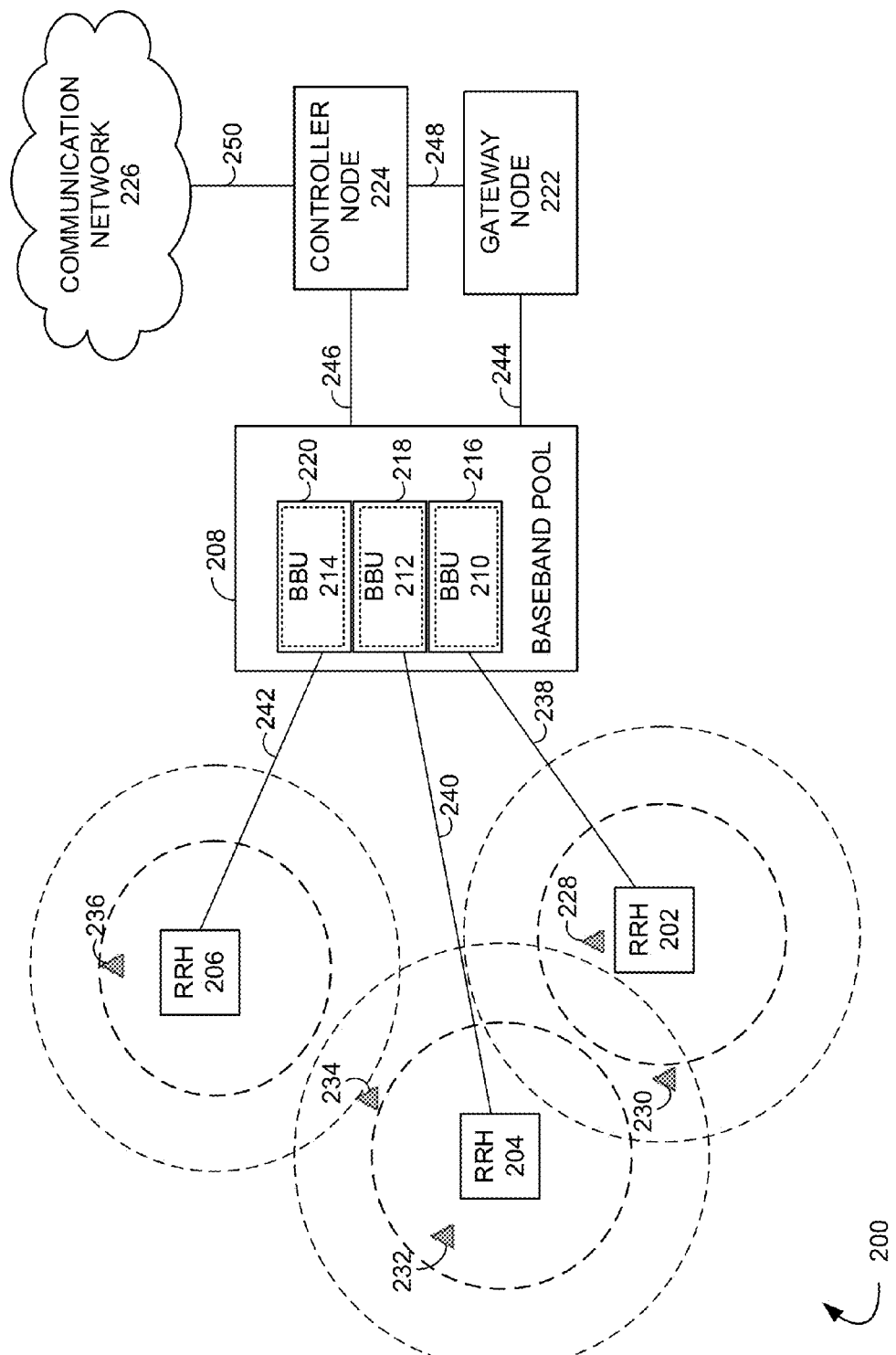
FIG. 2 illustrates another exemplary communication system for scheduling low-delay transmissions from an access node to a selected wireless device.

FIG. 2 illustrates another exemplary communication system 200 for scheduling low-delay transmissions from an access node. Communication system 200 can comprise wireless devices 228, 230, 232, 234, 236, access nodes 216, 218, 220 (e.g., RRHs 202, 204, 206 and BBUs 210, 212, 214), gateway node 222, controller node 224, and communication network 226. Other network elements may be present in the communication system 200 to facilitate communication but are omitted for clarity, such as base stations, base station controllers, gateways, mobile switching centers, dispatch application processors, and location registers such as a home location register or visitor location register. Furthermore, other network elements may be present to facilitate communication which are omitted for clarity, including additional processing nodes, routers, gateways, and physical and/or wireless data links for carrying data among various network elements.

Wireless devices 228, 230, 232, 234, 236 can be any device configured to communicate over communication system 200 using a wireless interface. For example, wireless devices 228, 230, 232, 234, 236 can include a remote terminal unit, a cell phone, a smart phone, a computing platform such as a laptop, palmtop, or a tablet, a personal digital assistant, or an internet access device, and combinations thereof.

The wireless interface of wireless devices 228, 230, 232, 234, 236 can include one or more transceivers for transmitting and receiving data over communication system 200. Each transceiver can be associated with the same or different frequency bands, the same or different radio access technologies, the same or different network providers, and/or the same or different services. For example, wireless devices 228, 230, 232, 234, 236 can include a transceiver that is associated with one or more of the following: code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (Wi-Fi), Bluetooth, Zigbee, infrared data association (IrDA), multimedia broadcast multicast service (MBMS), etc.

While not illustrated in FIG. 2 for clarity, wireless devices 228, 230 can be in communication with baseband unit 210 via RRH 202 and wireless devices 232, 234 can be in communication with baseband unit 212 via RRH 204 through communication links. Wireless device 236 can be in communication with BBU 214 via RRH 206 through a communication link. As illustrated in FIG. 2, RRH 202 can be in communication with BBU 210 through communication link 238, RRH 204 can be in communication with BBU 212 through communication link 240, and RRH 206 can be in communication with BBU 214 through communication link 242. The communication links can use various communication media, such as air, space, metal, optical fiber, or some other signal propagation path—including combinations thereof. The communication links may comprise many different signals sharing the same link. The communication links could include multiple signals operating in a single "air path" comprising beacon signals, user communications, communication sessions, overhead communications, frequencies, timeslots, transportation ports, logical transportation links, network sockets, packets, or communication directions. For example, user communication between wireless device 236 and access node 220 (e.g., RRH 206 and BBU 214) could share the same representative wireless link, but be transferred over different communication sessions, frequencies, timeslots, packets, ports, sockets, logical transport links, or in different directions—including combinations thereof.

Wireless devices 228, 230, 232, 234, 236 can transmit and/or receive information over communication system 200 using various communication services. These services can include various voice, data, and/or MBMS services and applications. For example, mobile voice services, mobile data services, push-to-talk services, internet service web browsing, email, pictures, picture messaging, video, video messaging, broadcast video, audio, voicemail, music, MP3's, ring tones, stock tickers, new alerts, etc.

Access nodes 216, 218, 220 (e.g., RRHs 202, 204, 206 and BBUs 210, 212, 214) can be any network node configured to provide communication between wireless device 228, 230, 232, 234, 236 and communication network 226. Access 216, 218, 220 (e.g., RRHs 202, 204, 206 and BBUs 210, 212, 214) can be standard access nodes or short range, low power access nodes. A standard access node can be a macrocell access node such as a base transceiver station, a radio base station, an eNodeB device, or an enhanced eNodeB device, or the like. A short range access node can include a microcell base station, a picocell base station, a femtocell base station, or the like such as a home eNodeB device. In addition, a wireless device configured to enter a hotspot mode can be a femtocell access node. It is noted that while three access nodes 216, 218, 220 (e.g., RRHs 202, 204, 206 and BBUs 210, 212, 214) are illustrated in FIG. 2, any number of access nodes can be implemented within system 200.

Access nodes 216, 218, 220 (e.g., RRHs 202, 204, 206 and BBUs 210, 212, 214) can comprise a processor and associated circuitry to execute or direct the execution of computer-readable instructions to obtain information. Access nodes 216, 218, 220 (e.g., RRHs 202, 204, 206 and BBUs 210, 212, 214) can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access nodes 216, 218, 220 (e.g., RRHs 202, 204, 206 and BBUs 210, 212, 214) can receive instructions and other input at a user interface.

Gateway node 222 can be any network node configured to interface with other network nodes using various protocols that communicates, routes, and forwards communication data addressed to a wireless device 228, 230, 232, 234, 236. In addition, gateway node 222 can act as a mobility anchor for wireless devices 228, 230, 232, 234, 236 during handovers between different frequencies and/or different radio access technologies supported by the same access node. Gateway node 222 can be a standalone computing device, computing system, or network component, and can be accessible, for example, by a wired or wireless connection, or through an indirect connection such as through a computer network or communication network. For example, gateway node 222 can include a serving gateway (SGW) and/or public data network gateway (PGW), etc. One of ordinary skill in the art would recognize that gateway node 222 is not limited to any specific technology architecture, such as Long Term Evolution (LTE) and can be used with any network architecture and/or protocol.

Gateway node 222 can comprise a processor and associated circuitry to execute or direct the execution of computer-readable instructions to obtain information. Gateway node 222 can retrieve and execute software from storage, which can include a disk drive, a flash drive, memory circuitry, or some other memory device, and which can be local or remotely accessible. The software comprises computer programs, firmware, or some other form of machine readable instructions, and may include an operating system, utilities, drivers, network interfaces, applications, or some other type of software, including combinations thereof. Gateway node 222 can receive instructions and other input at a user interface.

Controller node 224 can be any network node configured to communicate information and/or control information over communication system 200. Controller node 224 can be configured to transmit control information associated with a handover procedure. Controller node 224 can be a standalone computing device, computing system, or network component, and can be accessible, for example, by a wired or wireless connection, or through an indirect connection such as through a computer network or communication network. For example, controller node 224 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 224 is not limited to any specific technology architecture, such as Long Term Evolution (LTE) and can be used with any network architecture and/or protocol.

Controller node 224 can comprise a processor and associated circuitry to execute or direct the execution of computer-readable instructions to obtain information. Controller node 224 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers' network interfaces, applications, or some other type of software, including combinations thereof. Controller node 224 can receive instructions and other input at a user interface.

Although not illustrated in FIG. 2, access nodes 216, 218, 220 (e.g., RRHs 202, 204, 206 and BBUs 210, 212, 214) can be in communication with each other through communication links. Access nodes 216, 218, 220 (e.g., RRHs 202, 204, 206 and BBUs 210, 212, 214) can be in communication with gateway node 222 through communication link 244 and with controller node 224 through communication link 246. Gateway node 222 can be in communication with controller node 224 through communication link 248 and with communication network 226 through communication link 250.

Communication links 238, 240, 242, 244, 246, 248, 250 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can be used. Communication links 238, 240, 242, 244, 246, 248, 250 can be a direct link or might include various equipment, intermediate components, systems, and networks.

Communication network 226 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 226 can be capable of carrying data, for example, to support voice, push-to-talk, broadcast video, and data communications by a wireless device, such as wireless device 236. Wireless network protocols can comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 226 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 226 can also comprise additional base stations, controller nodes telephony switches, internet routers, network gateways, computer systems, communication links, or some other type of communication equipment, and combinations thereof.

In operation, BBUs 210, 212, 214 can be centrally located at baseband pool 208 and may include a centralized packet scheduler (not shown). The centralized packet scheduler (not shown) can be configured to coordinate packet transmission of a minimum schedulable physical resource blocks (e.g., two resource blocks per one transmission time interval) from the BBUs 210, 212, 214 of access nodes 216, 218, 220 among connected wireless devices 228, 230, 232, 234, 236 in communication system 200 via RRHs 202, 204, 206.

For example, in an exemplary embodiment, the centralized packet scheduler (not shown) can collect and store capacity and transmission delay characteristics (e.g., guaranteed bit rate/non-guaranteed bit rate, busy hour, backhaul limitations/capacity, mobility, available spectrum, etc.) reported by wireless devices 228, 230, 232, 234, 236 at the BBUs 210, 212, 214 of access nodes 216, 218, 220. The centralized packet scheduler (not shown) distributes the wireless resources (e.g., the next available physical resource blocks, wireless spectrum, etc.) among wireless devices 228, 230, 232, 234, 236 via RRHs 202, 204, 206 based on the collected characteristics.

The communication network 226 can prioritize packet transmission of physical resource blocks to wireless devices 228, 230, 232, 234, 236 reporting high transmission delay characteristics (e.g., guaranteed bit rate/non-guaranteed bit rate, busy hour, backhaul limitations/capacity, mobility, available spectrum, etc.). For example, in an exemplary embodiment, each wireless device 228, 230, 232, 234, 236 in communication system 200 can calculate a total delay between packet transmissions to the wireless device 228, 230, 232, 234, 236 and report the calculated delay to the BBU 210, 212, 214 via respective RRHs 202, 204, 206 and communication links 238, 240, 242. Wireless devices, for example, wireless devices 228, 230, that are served by RRHs 202 connected to BBUs 210 with high-delay, low throughput communication links 238 (e.g., non-fiber communication links) will experience a higher total delay between packet transmissions than wireless devices, for example, wireless devices 232, 234, 236, served by RRHs 204, 206 connected to BBUs 212, 214 with low-delay, high throughput communication links 240, 242 (e.g., fiber communication links). Because of this, in an exemplary embodiment, communication network 226 can select a scheduling algorithm for scheduling packet transmission via the centralized packet scheduler of wireless resources (e.g., the next available physical resource blocks, wireless spectrum, etc.) that accounts for calculated delays (e.g., based on the collected characteristics) between packet transmissions reported by wireless devices 228, 230, 232, 234, 236. The scheduling algorithms can include, for example, a fair scheduling algorithm, a data rate scheduling algorithm, and a hybrid scheduling algorithm.

Figure 3:
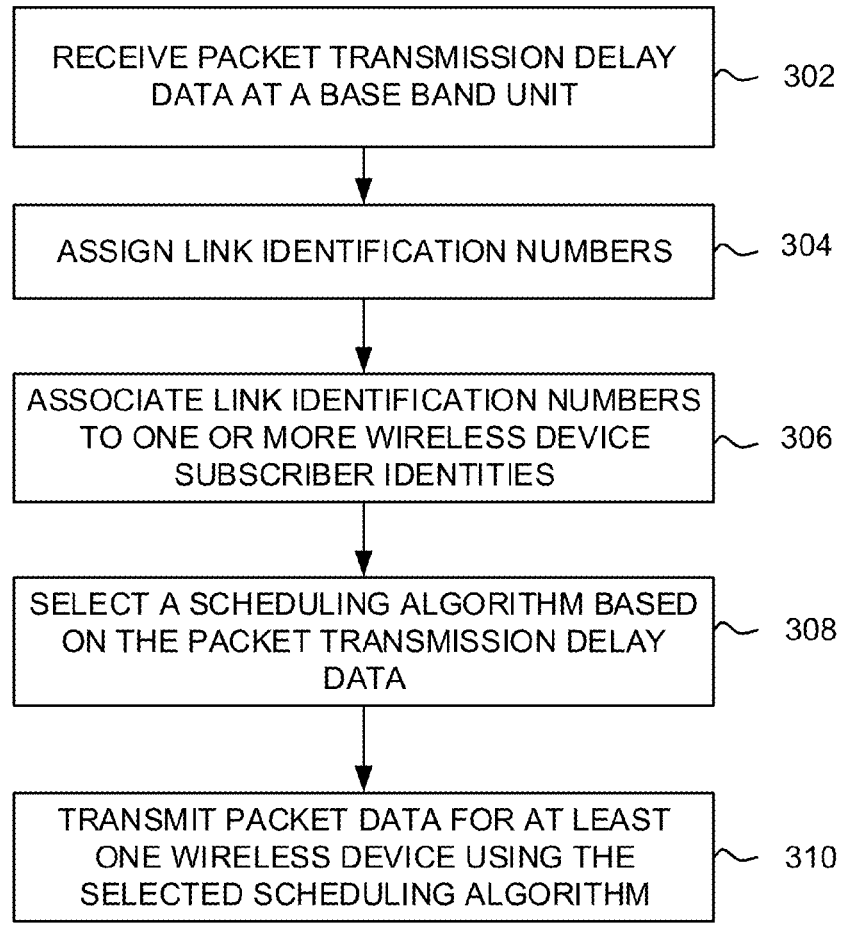
FIG. 3 illustrates an exemplary method for scheduling low-delay transmissions from an access node to a selected wireless device.

FIG. 3 illustrates a flow chart of an exemplary method for scheduling low-delay transmissions from an access node to a selected wireless device. The method will be discussed with reference to the exemplary communication system 200 illustrated in FIG. 2. However, the method can be implemented in the exemplary communication system 100 illustrated in FIG. 1 or any other suitable communication system.

In addition, although FIG. 3 depicts steps performed in a particular order for purpose of illustration and discussion, the methods discussed herein are not limited to any particular order or arrangement. One skilled in the art, using the disclosure provided herein, will appreciate that various steps of the methods can be omitted, rearranged, combined and/or adapted in various ways.

Referring to FIG. 3, at step 302, a network node can receive transmission delay data (e.g., guaranteed bit rate/non-guaranteed bit rate, busy hour, backhaul limitations/capacity, mobility, available spectrum, etc.) at a BBU from a connected wireless device. For example, a wireless device 228, 230, 232, 234, 236 may initially establish a communication link (not shown) with access nodes 216, 218, 220 via RRHs 202, 204, 206 (e.g., upon initialization or during a handover procedure). RRHs 202, 204, 206 may be connected to respective BBUs 210, 212, 214 of access nodes 216, 218, 220 via communication links 238, 240, 242. Data packets addressed to the wireless devices 228, 230, 232, 234, 236 may be communicated from controller node 224 to wireless devices 228, 230, 232, 234, 236 via BBUs 210, 212, 214 and RRHs 202, 204, 206.

In an exemplary embodiment, access nodes 216, 218, 220 may perform radio resources management and control procedures on the radio interface of wireless devices 228, 230, 232, 234, 236 to detect delay data (e.g., guaranteed bit rate/non-guaranteed bit rate, busy hour, backhaul limitations/capacity, mobility, available spectrum, etc.) reported by wireless devices 228, 230, 232, 234, 236 and associated with respective communication links 238, 240, 242. Wireless devices, for example, wireless devices 228, 230, that are served by RRHs 202 connected to BBUs 210 by high-delay, low throughput communication links 238 (e.g., non-fiber communication links) may experience more delays than wireless devices 232, 234, 236 served by RRHs 204, 206 connected to BBUs 212, 214 by low-delay, high throughput communication links 240, 242 (e.g., fiber communication links).

In another exemplary embodiment, each wireless device 228, 230, 232, 234, 236 served by RRHs 202, 204, 206, via radio frequency transmissions, can calculate a total delay (TD) between data packets addressed to the wireless device 228, 230, 232, 234, 236 and report the calculated TD to the BBU 210, 212, 214 of respective access node 216, 218, 220. The BBUs 210, 212, 214 of access nodes 216, 218, 220 may be combined at a centralized location, e.g., baseband pool 208.

At step 304, unique link identification numbers are assigned to each of the communication links and to each RRH in communication with the BBU. For example, the communication network 226 via controller node 224 and gateway node 222 can assign unique link identification numbers to each RRH 202, 204, 206 and to each communication link 238, 240, 242 connecting RRHs 202, 204, 206 to respective BBUs 210, 212, 214. BBUs 210, 212, 214 can be centrally located at baseband pool 208 and configured to store, for example, an International Mobile Subscriber Identity (IMSI) of wireless devices 228, 230, 232, 234, 236, 238, the unique link identification numbers assigned to RRHs 202, 204, 206, and the TD associated with each communication link 238, 240, 242, in a look-up table at the BBUs 210, 212, 214 of access nodes 216, 218, 220.

In an exemplary embodiment, the look-up table is used to match an IMSI reported by a connected wireless device 228, 230, 232, 234, 236 to a unique link identification number that corresponds to a specific RRH 202, 204, 206 and communication link 238, 240, 242. The BBUs 210, 212, 214 of access nodes 216, 218, 220 use this information to map the wireless devices 228, 230, 232, 234, 236 to a particular RRH 202, 204, 206 and communication link 238, 240, 242.

In another exemplary embodiment, a second look-up table is stored at the BBUs 210, 212, 214 of access nodes 216, 218, 220. For example, the second look-up table may store the matched IMSI's reported by the connected wireless devices 228, 230, 232, 234, 236, the RRH link identification numbers, and the calculated TDs.

In another exemplary embodiment, the centralized packet scheduler (not shown) can prioritize transmission of packet data to wireless devices 228, 230, 232, 234, 236 based on the calculated TDs. For example, the centralized packet scheduler can schedule transmission of packet data to wireless devices, for example, wireless devices 228, 230, experiencing high-delays, low-throughput (e.g., non-fiber communication links) before wireless devices, for example, wireless devices 232, 234, 236, experiencing low-delays, high throughput (e.g., fiber communication links).

At step 308, a scheduling algorithm may be selected at the BBU from among a plurality of scheduling algorithms for a given access node based on transmission delay data (e.g., guaranteed bit rate/non-guaranteed bit rate, busy hour, backhaul limitations/capacity, mobility, available spectrum, etc.) associated with at least one of the communication links. For example, in an exemplary embodiment, the communication network 226 initially calculates a channel quality indicator (CQI) value for connected wireless devices 228, 230, 232, 234, 236. The CQI value can be based on a reference signal level, e.g., measured in signal to interference plus noise ratio (SINR), received at the wireless device 228, 230, 232, 234, 236 from a serving access node, for example, access nodes 216, 218, 220. The CQI value can be tracked by access nodes 216, 218, 220 and/or controller node 224 based on measurement reports transmitted from wireless devices 228, 230, 232, 234, 236 to BBUs 210, 212, 214 via RRHs 202, 204, 206. The CQI value for each wireless device 228, 230, 232, 234, 236 may be updated periodically.

A scheduling algorithm may be selected for a particular access node, for example, access node 216, based on the measured CQI value and/or other reported delays. The centralized packet scheduler (not shown) can use the selected scheduling algorithm to prioritize data packet transmissions to wireless devices, for example, wireless devices 228, 230, experiencing the highest transmission delays (e.g., guaranteed bit rate/non-guaranteed bit rate, busy hour, backhaul limitations/capacity, mobility, available spectrum, etc.), and lowest throughput. The scheduling algorithms may be selected from a fair scheduling algorithm, a data rate scheduling algorithm, and a hybrid scheduling algorithm.

Fair scheduling algorithms, for example, a round robin algorithm, distribute wireless resources (e.g., the next available physical resource blocks, wireless spectrum, etc.) equally among, for example, both wireless devices 228, 230 connected to access nodes 216. Fair scheduling algorithms provide the highest degree of throughput fairness, but generally have the lowest average throughput.

Data rate scheduling algorithms, for example, maximum CQI, schedule wireless resources (e.g., the next available physical resource blocks, wireless spectrum, etc.) for the wireless device, for example, wireless device 228, connected to access node 216 that reports the highest channel quality (e.g., highest reported CQI). Data rate scheduling algorithms provide the maximum possible average throughput, but generally have low throughput fairness since wireless resources are scheduled based on the highest reported CQI.

Hybrid scheduling algorithms, for example, Quality of Service (QoS) based proportional fairness, schedule wireless resources (e.g., the next available physical resource blocks, wireless spectrum, etc.) for the wireless device, for example, wireless device 230, connected to access nodes 216 whose instantaneous channel conditions are better than average channel conditions. For example, communication system 200 may track CQI values for each wireless device 228, 230, 232, 234, 236 connected to access nodes 216, 218, 220 over a time period (e.g., minutes, hours, etc.). The tracked CQI values are averaged for each wireless device 228, 230, 232, 234, 236 over the time period (e.g., average CQI value). An instantaneous CQI value is determined for each wireless device 228, 230, 232, 234, 236 connected to access nodes 216, 218, 220 and a metric may be calculated (for each wireless device 228, 230, 232, 234, 236) based on a ratio of the instantaneous CQI value per average CQI value. The communication system 200 schedules the next available physical resource block for the wireless device 230 with the highest calculated metric. Hybrid scheduling algorithms balance throughput and fairness, but generally have a high computation power.

In an exemplary embodiment, wireless devices 228, 230, 232, 234, 236 can include a cell phone, a smart phone, a computing platform such as a laptop, palmtop, or a tablet, a personal digital assistant, or an internet access device, and combinations thereof. Each wireless device may be categorized as either a low data device, a medium data device, or a high data device. For example, a smart phone may comprise a wireless device capable of running data intensive applications (e.g., video streaming), while a basic phone may not have the same capabilities. In one exemplary embodiment, the scheduling algorithm may be based on the category of the data device, e.g., low, medium, or high.

At step 310, packet data may be transmitted to at least one wireless device using the selected scheduling algorithm. For example, the centralized packet scheduler (not shown) transmits packet data from BBU 210 to, for example, wireless device 228 via communication link 238 and RRH 202 using the QoS based proportional fairness algorithm.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 4:
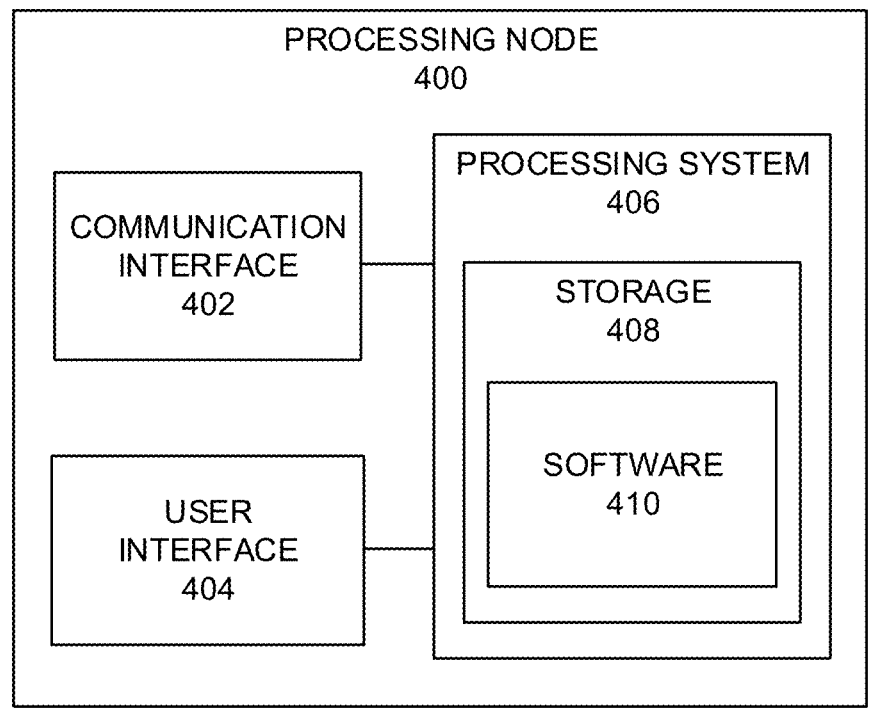
FIG. 4 illustrates an exemplary processing node.

FIG. 4 illustrates an exemplary processing node 400 in a communication system. Processing node 400 comprises communication interface 402, user interface 404, and processing system 406 in communication with communication interface 402 and user interface 404. Processing node 400 can be configured to determine a communication access node for a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

Examples of processing node 400 include controller node 412 and gateway node 414. Processing node 400 can also be an adjunct or component of a network element, such as an element of access nodes 106, 108, 216, 218, 220 and the like. Processing node 400 can also be another network element in a communication system. Further, the functionality of processing node 400 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for scheduling low-delay transmissions from an access node, the method comprising:
   receiving, at at least one base band unit (BBU), a total packet delay calculated for each of one or more wireless devices served by a plurality of antennas connected to the at least one BBU via communication links, the total packet delay being a total delay between one or more data packets received at the wireless device;
   determining, at the BBU, delay associated with the communication links;
   assigning unique link identification numbers to each of the plurality of antennas and to each of the communication links connecting the plurality of antennas to the at least one BBU;
   storing the assigned unique link identification numbers in a look-up table at the BBU;
   associating, via the look-up table, subscriber identities reported by the one or more wireless devices to the unique link identification numbers;
   selecting a scheduling algorithm for at least one wireless device of the one or more wireless devices from one or more scheduling algorithms based on the association, wherein the at least one wireless device is served by the antenna connected to the BBU via the communication link having a highest-delay and lowest throughput of the communication links; and
   transmitting packet data for the at least one wireless device using the selected scheduling algorithm,
   wherein the calculated total packet delay and the associated subscriber identities are stored in a second look-up table at the BBU.

2. The method of claim 1, wherein the scheduling algorithm is at least one of a fair scheduling algorithm, a data rate scheduling algorithm, and a hybrid scheduling algorithm.

3. The method of claim 2, wherein the fair scheduling algorithm is a round robin scheduling algorithm, the data rate scheduling algorithm is a maximum CQI algorithm, and the hybrid scheduling algorithm is a proportional fairness algorithm.

4. The method of claim 1, wherein at least one first antenna experiences transmit delays that are greater than at least one second antenna of the plurality of antennas.

5. The method of claim 4, wherein the scheduling algorithm prioritizes transmission of packet data based on the transmit delay experienced by the at least one first antenna.

6. A system for scheduling low-delay transmissions from an access node, the system comprising:
   a controller node configured to:
     receive, at at least one base band unit (BBU), a total packet delay calculated for each of one or more wireless devices served by a plurality of antennas connected to the at least one BBU via communication links;
     determine, at the BBU, delay associated with the communication links;
     assign unique link identification numbers to each of the plurality of antennas and to each of the communication links connecting the plurality of antennas to the at least one BBU;
     store the assigned unique link identification numbers in a look-up table at the BBU;
     associate, via the look-up table, subscriber identities of the one or more wireless devices to the unique link identification numbers;
     select, at the BBU, a scheduling algorithm for at least one wireless device of the one or more wireless devices from one or more scheduling algorithms based on the association, wherein the at least one wireless device is served by the antenna connected to the BBU via the communication link having a highest-delay and lowest throughput of the communication links packet delay; and
     transmit packet data for the at least one wireless device using the selected scheduling algorithm,
   wherein the calculated total packet delay and the associated subscriber identities are stored in a second look-up table at the BBU.

7. The system of claim 6, wherein the scheduling algorithm is at least one of a fair scheduling algorithm, a data rate scheduling algorithm, and a hybrid scheduling algorithm.

8. The system of claim 7, wherein the fair scheduling algorithm is a round robin scheduling algorithm, the data rate scheduling algorithm is a maximum CQI algorithm, and the hybrid scheduling algorithm is a proportional fairness algorithm.

9. The system of claim 7, wherein at least one first antenna experiences transmit delays that are greater than at least one second antenna of the plurality of antennas.

10. The system of claim 9, wherein the scheduling algorithm prioritizes transmission of packet data based on the transmit delays experienced by the at least one first antenna.

11. The method of claim 1, wherein the one or more wireless devices are categorized as either a low data service device, a medium data service device, or a high data service device.

12. The method of claim 2, wherein the scheduling algorithm is selected from one or more scheduling algorithms based on the category of the at least one of the one or more wireless devices served by the antenna connected to the BBU through the communication link of the communication links having the highest delay and lowest throughput.

13. The method of claim 1, wherein the total data packet delay further includes transmission delay data associated with the communication links.

14. The method of claim 13, wherein the transmission delay data comprises guaranteed bit rate, non-guaranteed bit rate, busy hour, backhaul limitations, backhaul capacity, and available spectrum associated with the communication links.

15. The method of claim 1, wherein the scheduling algorithm is further selected from the one or more scheduling algorithms based on a measured CQI value of the at least one wireless device of the one or more wireless devices.

* * * * *